US008533167B1

(12) United States Patent
Ketkar et al.

(10) Patent No.: US 8,533,167 B1
(45) Date of Patent: Sep. 10, 2013

(54) COMPRESSED SET REPRESENTATION FOR SETS AS MEASURES IN OLAP CUBES

(71) Applicant: Guavus, Inc., San Marcos, CA (US)

(72) Inventors: Nikhil Shirish Ketkar, Gurgaon Haryana (IN); Gaurav Mishra, Gurgaon Haryana (IN); Jaskaran Singh Bawa, Faridabad Haryana (IN); Mark Crovella, Wayland, MA (US)

(73) Assignee: Guavus, Inc., San Mateo, CA (US)

( * ) Notice: Subject to any disclaimer, the term of this patent is extended or adjusted under 35 U.S.C. 154(b) by 0 days.

(21) Appl. No.: 13/744,015

(22) Filed: Jan. 17, 2013

Related U.S. Application Data

(60) Provisional application No. 61/695,863, filed on Aug. 31, 2012.

(51) Int. Cl.
*G06F 7/00* (2006.01)
*G06F 17/00* (2006.01)

(52) U.S. Cl.
USPC ............................ 707/693; 707/600; 707/607

(58) Field of Classification Search
None
See application file for complete search history.

(56) References Cited

U.S. PATENT DOCUMENTS

| 7,895,216 B2 * | 2/2011 | Longshaw et al. ............ 707/752 |
| 8,380,748 B2 * | 2/2013 | Berger et al. ................. 707/802 |
| 8,400,933 B2 * | 3/2013 | Bu et al. ........................ 370/252 |
| 2002/0026438 A1 * | 2/2002 | Rjaibi et al. ....................... 707/2 |
| 2009/0031175 A1 * | 1/2009 | Aggarwal et al. ................ 714/47 |
| 2009/0192980 A1 * | 7/2009 | Beyer et al. ........................ 707/2 |
| 2010/0114869 A1 * | 5/2010 | Deolalikar et al. ............ 707/718 |
| 2011/0239299 A1 * | 9/2011 | Chen et al. ....................... 726/23 |
| 2012/0290615 A1 * | 11/2012 | Lamb et al. .................... 707/770 |
| 2013/0024430 A1 * | 1/2013 | Gorelik ........................... 707/690 |
| 2013/0091144 A1 * | 4/2013 | Peters et al. ................... 707/748 |

OTHER PUBLICATIONS

Beyer et al., Distinct-Value Synopses for Multiset Operations, Communications of the ACM, vol. 52, No. 10, p. 87-95, published Oct. 2009.*
Aouiche et al., Unassuming View-Size Estimation Techniques in OLAP, published Dec. 2008.*
Whang et al., A Linear-Time Probabilistic Counting Algorithm for Database Applications, ACM Transactions on Database Systems, vol. 15, No. 2, p. 208-229, published Jun. 1990.*
Flajolet et al., On Adaptive Sampling, Computing vol. 34, p. 391-400, published 1990.*
Aouiche et al., A Comparison of Five Probabilistic View-Size Estimation Techniques in OLAP, DOLAP'07, p. 17-24, published Nov. 2007.*
Flajolet et al., Probabilistic Counting Algorithms for Database Applications, Journal of Computer and System Sciences, vol. 31, No. 2, p. 182-209, published Oct. 1985.*
Metwally et al., Why Go Logarithmic if We Can Go Linear? Towards Effective Distinct Counting of Search Traffic, EDBT'08, p. 618-629, published Mar. 2008.*

* cited by examiner

*Primary Examiner* — Jeffrey A Burke
(74) *Attorney, Agent, or Firm* — Bingham McCutchen LLP

(57) ABSTRACT

A cardinality of an incoming data stream is maintained in real time; the cardinality is maintained in a data structure that is represented by an unsorted list at low cardinalities, a linear counter at medium cardinalities, and a PCSA at high cardinalities. The conversion to the linear counter makes use of the data in the unsorted list, after which that data is discarded. The conversion to the PCSA uses only the data in the linear counter.

21 Claims, 7 Drawing Sheets

Compressed Set Representation After Inserting First Element
Value of Element = 42

Compressed Set Representation After Inserting Second Element
Value of Element = 43

Compressed Set Representation After Inserting Third Element
Value of Element = 42, No change in Buffer Compressed Set Representation After 1024 Unique Elements
have been inserted Compressed Set Representation After 1025 Unique Elements have been inserted. Appropriate bits are set in the Linear Counter and PCSA Sections of the Buffer

COMPRESSED SET REPRESENTATION FOR SETS AS MEASURES IN OLAP CUBES

CROSS-REFERENCE TO RELATED APPLICATIONS

This application claims priority to U.S. Provisional Patent Application Ser. No. 61/695,863, filed on Aug. 31, 2012, which is hereby incorporated herein by reference in its entirety.

BACKGROUND

On-line analytical processing ("OLAP") is a way of organizing data in which the data is arranged across one or more categories or "dimensions." For example, cellular phone calls made in the US (the data) may be classified/organized/accessed in multiple ways: by the US state in which each call was made (the first dimension), the date of each call (the second dimension), the type of phone used to make each call (the third dimension), and the carrier used to make each call (the fourth dimension). Arranging the data in this way allows a user to easily extract information from the data involving multiple variables by accessing the intersection or "union" of two or more dimensions. For example, the various dimensions may be efficiently queried to determine the number of cellular phone calls made in Massachusetts in July 2012, or the number of cellular phone calls made by ANDROID devices on the SPRINT network.

The dimensions of data may be represented in a data structure called a "cube," which may have any number of dimensions (i.e., while referred to as a "cube," the OLAP cube is not limited to a physical cube's three dimensions). The OLAP cube is, in one sense, another way of storing data, and thus may be maintained (albeit using a specialized layer implementing the cube's functionality) in a traditional database. In many cases, queries to the cube request only the number of unique values (or "cardinality") of a given dimension (e.g., the number of calls made in a certain area) rather than information specific to each value (e.g., the names of the people who made those cellular phone calls). In these cases, the cube may store only a representation of the cardinality (a "measure") instead of the full dimension (e.g., the number of cellular calls instead of the entire data record for each cellular call). Data may be first stored as a dimension and then later condensed into a measure; the act of condensing a dimension into a measure is known as "folding," and the data structure used to hold the information in a measure is called a "set."

In many OLAP applications, additional data may arrive in real time (i.e., new items of data may arrive every minute, second, millisecond, or at any other timeframe), and the new data may be added to the existing data already in the cube. For example, new cellular-phone usage data may arrive from a cellular carrier, representing recent cellular-phone activity, and this new data may be added to the appropriate sets in the cube. The cardinality of a given set may thus vary greatly, from a few to a few million, depending on the type of dimension, the amount of input data, the length of time of data collection, and/or many other factors. At small cardinalities, the data may be stored straightforwardly and uncompressed in the set; at larger cardinalities, a straightforward storage of the data takes up too much memory space, and the data is therefore stored in a compressed form (at the expense of the loss of information beyond the mere cardinality of the data and/or the loss of some accuracy in estimating the exact cardinality of the data). The set that holds the values has to accommodate this wide range of sizes while also supporting other functions, such as adding a new element as new data arrives ("set insertion"), determining (or accurately estimating, in the case of large cardinalities) the number of unique items in a set ("querying set cardinality"), and merging sets ("performing a set union") in response to a query. These and other operations must be performed in an amount of time that does not grow as cardinality grows, in order to keep up with the real-time input data. Finally, because OLAP cubes are typically implemented on top of traditional databases, the sets themselves must have a small memory footprint (e.g., approximately four kilobytes, which is often the maximum size of a field in a typical database). By "memory footprint" is meant the amount of main memory actually occupied by, or allocated to, the OLAP cube data.

The data in a set may be stored in a data structure in many different ways; some representations may be more efficient, accurate, and/or faster at small cardinalities, while other representations may be more efficient, accurate, and/or faster at medium or large cardinalities. For example, an uncompressed, fixed-size unsorted list (or, alternatively, a set using D-left hashing) may be preferable at low cardinalities (e.g., less than 1,000 elements); sets of this size do not consume an appreciable amount of memory space, and the uncompressed data may be useful if, for example, further information is required from each set member. At higher set cardinalities (e.g., greater than 1,000 elements), the uncompressed representation consumes too much memory (i.e., more than the four kilobytes available in a typical database) and, at this number of elements, the cardinality of the set may be more useful or interesting than the details of a particular member of the set. Thus, at this mid-range set cardinality (e.g., between 1,000 and 20,000 elements), a linear counter may be preferable; this data structure compresses the data elements (such that details beyond the cardinality of the set are lost) and provides only an estimate of the cardinality, but occupies a small, fixed memory space (independent of the cardinality of the set). Linear counters, however, become inaccurate at very high cardinalities (e.g., more than 20,000 elements); at these cardinalities, the set may be better represented by a probabilistic counter with stochastic averaging ("PCSA") or a log-log counter. These data structures, while inaccurate at low cardinalities, provide accurate estimates of the cardinality of large sets.

Thus, while none of the aforementioned data structures is optimal for all cardinalities of a set, each one is optimal for a given range of cardinalities. Existing systems describe the use of different data structures at different levels of cardinality; an uncompressed list at low cardinalities, for example, transitioning to a linear counter and/or PCSA at higher cardinalities. Data is first stored in a first data structure and, once the cardinality of the set increases past a threshold, the data is converted to a different data structure. Thus, the set is always represented optimally by one of a plurality of data structures.

As mentioned above, however, the conversion of an uncompressed list to either one of a linear counter or PCSA represents a loss of information. That is, while the uncompressed list stores actual data elements, the linear counter and PCSA store only the number of data elements. Conversion from the uncompressed list to either of the linear counter or PCSA is trivial; it simply requires a number if set insertions equal to the number of elements stored in the uncompressed list. Without the availability of the uncompressed list, however, existing systems provide no method of converting the data to the linear counter or PCSA; once the original data is abandoned, no further conversion is possible.

As one solution, existing systems maintain both a linear counter and PCSA in parallel. The uncompressed set is used until it becomes untenable, at which point its cardinality is converted to both the linear counter and PCSA (which is, as noted above, a trivial conversion). Both of these compressed sets are maintained as the cardinality increases, though for medium cardinalities, only the linear counter is trusted (i.e., because the PCSA provides accurate cardinality estimates only at very high cardinalities). Once a threshold cardinality is crossed, the PCSA is used instead of the linear counter. The parallel maintenance of the PCSA is thus wasted overhead until when and if the cardinality of the set increases to the point at which the PCSA becomes preferred over the linear counter. This dual maintenance of the two data structures consumes an unacceptable amount of memory space (given, in particular, the four-kilobyte limit of a field in a typical database). Further, because the linear counter's upper limit of cardinality depends upon the amount of space available to store the counter, and because that space is lessened by the need to also maintain the PCSA, the effectiveness of the linear counter is further reduced. A need therefore exists for a way to transition between the uncompressed, linear counter, and PCSA representations (or their equivalents) without wasting the memory space required to maintain two representations simultaneously (e.g., both the linear counter and PCSA).

SUMMARY

In various embodiments, the present invention represents a set having an increasing cardinality as first an uncompressed list (or equivalent), then as a linear counter (or equivalent), and finally as a PCSA (or equivalent) without the need to maintain multiple representations simultaneously. The data is represented first solely by the uncompressed list and then, once the cardinality passes a first threshold (at, e.g., 1,000 elements), converted to the linear counter using a series of set-insertion operations. If the cardinality of the linear counter rises past a second threshold at which the linear counter becomes inaccurate (at, e.g., 20,000 elements), the data from the linear counter is converted to a PCSA counter without the need to retain the original, uncompressed list to create the PCSA from that list. In one embodiment, a plurality of uniformly random numbers, equal in number to the cardinality of the set, is inserted into the PCSA counter, after which the linear counter is discarded. Thus, not only is the size of the required storage reduced by eliminating the need to maintain multiple, redundant representations of the set (a critical requirement imposed by the use entries of typical databases) but, in addition, the extra space thereby available to the linear counter (by virtue of not having to simultaneously maintain the PCSA) extends the useful range of the linear counter and allows it to work with a greater range of cardinalities.

In one aspect, a method for storing a cardinality of a plurality of unique items of data in a received data stream includes storing, in a computer memory, unique data items in the form of an unsorted list. When the number of unique items stored in the computer memory crosses a first threshold, the items in the unsorted list are converted into a linear counter executable by a processor; the unsorted list is discarded from the computer memory. The processor is caused to count further unique items in the received data stream using the linear counter. When the number of unique items stored in the computer memory crosses a second threshold, the data in the linear counter is converted into a PCSA structure or log-log counter; the linear counter is discarded from the computer memory. The processor is caused to count further unique items in the received data stream using the PCSA structure or log-log counter.

The first threshold may be 1,024 elements and the second threshold may be 20,000 elements. The unsorted list, linear counter, and PCSA or log-log counter may use the same memory footprint, which may be less than approximately four kilobytes. Converting the data in the linear counter into the PCSA structure may include inserting a plurality of random numbers (having a size approximately equal to a cardinality of the linear counter) into the PCSA structure. A query may be received for the number of unique items in the data stream and responded to using information in the unsorted list, linear counter, or PCSA.

A union operation may be performed on the unsorted list and a second unsorted list; the result may be converted into a linear counter if a size of the result of the union operation exceeds a threshold. Another union operation may be performed on the linear counter and a second linear counter; the result may be converted into a PCSA structure if a size of the result of the union operation exceeds a threshold. Another union operation may be performed on the linear counter and a second unsorted list; the result may be converted into a PCSA structure if a size of the result of the union operation exceeds a threshold. The data items may be organized within a database, which may be queried to identify unique data items consistent with a query.

In another aspect, a system for determining a number of unique items of data in an incoming data stream includes a network port for receiving the data stream, a memory for storing at least a portion of the data stream, and a processor for analyzing the data stream and maintaining a data structure representing the number of unique items therein. The processor is configured to convert the data structure from an unsorted list to a linear counter when the number of unique items crosses a first threshold and from the linear counter to a PCSA structure or log-log counter when the number of unique items crosses a second threshold.

The data structure may be a set, and the set may be a measure in an OLAP cube. The data structure may be stored in a field in a database. The incoming data stream may include cellular-phone data. The system may further include a database management system executable by the processor and an input device for receiving a database query, wherein the database management system is configured to locate data in the memory consistent with the query.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1:
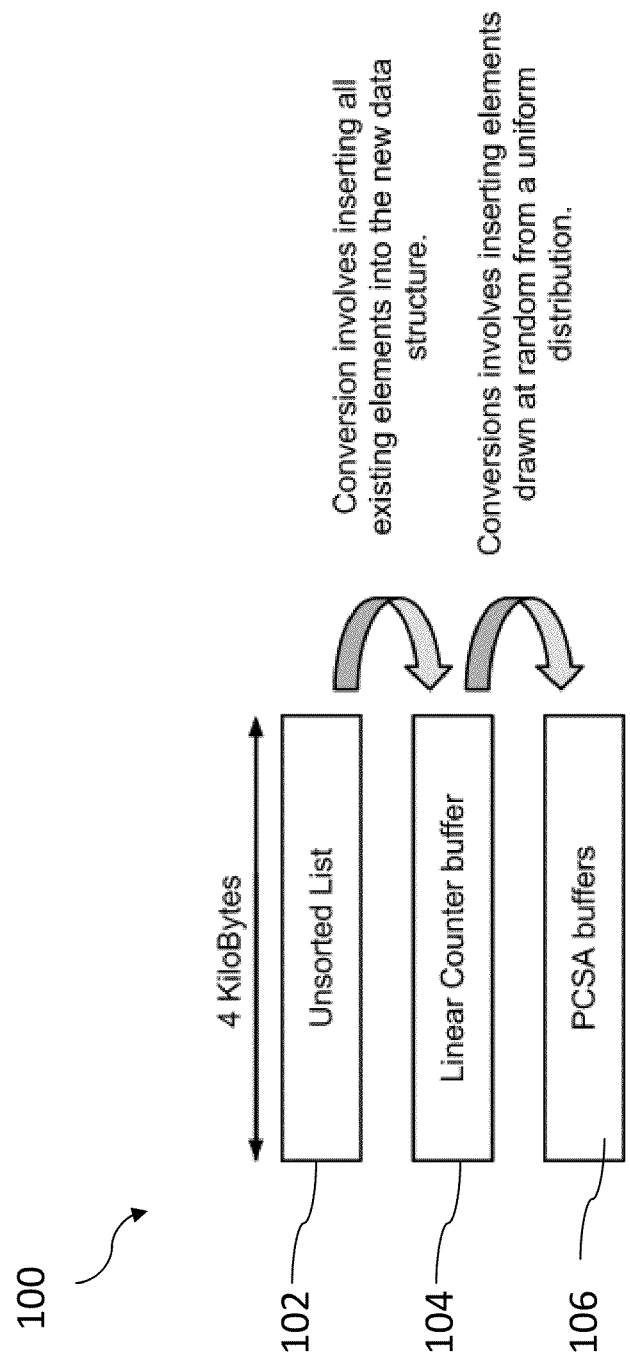
FIG. 1 illustrates the use of a fixed memory size with multiple set representations in accordance with an embodiment of the present invention.

In various embodiments, a measure of an OLAP cube is represented by a set, and at low cardinalities, the set is stored first as an unsorted list. As the cardinality of the set increases, the unsorted list is converted to a linear counter by inserting each of the members of the unsorted list into the linear counter. Once the cardinality increases still further, the linear counter is converted into a PCSA by generating a plurality of random numbers and inserting them into the PCSA. FIG. 1 illustrates a four-kilobyte storage space 100 (which is the size of a field in a typical database) that may be used to store the set. The storage space 100 may be any size, however, and may be any volatile or non-volatile magnetic, solid-state, flash, or other media or memory. One such storage space 100 may be used for each set or, in other embodiments, multiple sets may be stored in a single storage space. The present invention is not limited to any particular arrangement of the storage space 100.

The storage space 100 includes a representation 102 of a set as an unsorted list. In one embodiment, new data elements are added to the unsorted list 102 as they arrive. Because the elements are uncompressed, additional information about each element (i.e., more information than simply the number of data elements) may be available. Given an element of size $e_s$ and a maximum capacity n, the fixed-size unsorted list 102 may store the elements in a continuous array of size $e_s \times n$. The number of elements currently stored in the list may be maintained using a counter implemented with, e.g., an unsigned integer data type. An insert operation includes scanning the elements of the list and checking if the element to be inserted already exists in the list. If the element is not present, it may be written in the first empty slot (or any other slot in the list), and the counter is incremented. Slots may be filled in order (starting with the first location ending with location corresponding to n) or in any order known in the art. A union operation (implementing, for example, a query to the cube) includes scanning over the elements of two or more lists and identifying elements to be added to one of the lists. A query for the cardinality of the set simply involves returning the value of the counter. Thus, insertion of a new element is an O(n) operation and union is an O(n²) operation, but, given that n is fixed, all operations are performed in constant time. A fixed-size unsorted list therefore support insertions, unions, and querying the cardinality of sets up to size n with no error.

In an alternative embodiment, D-left hashing is used in place of an unsorted list. In the case of an unsorted list, the insertion is an O(n) operation and union is an O(n²) operation, but the size of the list, fixed to one thousand (meaning that union and insertion operations are constant-time, fast operations). An implementation using D-left hashing would allow for slightly fewer elements (approximately 900) using the same size memory footprint as the unsorted list; the D-left hashing implementation may, however, yield relatively faster union operations and relatively slower insertion operations. While the most time-consuming step in working with an unsorted list is passing/scanning over the elements in the set, the most time-consuming step in the D-left hashing implementation is the computation of two hash functions. Choosing between an unsorted list and D-left hashing is an implementation-specific detail, and an appropriate choice may be made based, e.g., on profiling the operation patterns (number of unions vs. number of insertions) and the particular hardware in use.

An additional feature of the unsorted list 102 is its non-lossy storage (i.e., the actual elements are accessible for retrieval). Typically, when the set contains a large number of elements one may not want to enumerate all the elements, but for smaller set sizes certain use cases are conceivable which might require enumerating elements in the set. For instance, consider detecting customers or subscribers engaged in suspicious activity on a network. In an OLAP cube (with one dimension indicating suspicious activity), a set (represented as a measure) stores identifiers of the customers or subscribers. Now, it is conceivable that if the set contains only a few subscribers, the network operator might want to get their unique identifiers. Another use case for non-lossy set representation for smaller cardinalities is the case where in a zero error is expected for small cardinalities sets. This can happen during system integration and testing with small datasets. A non-lossy set representation which gives perfect accuracy is of great value in such scenarios.

Returning to FIG. 1, the unsorted list 102 is converted to a linear counter 104 when its cardinality increases past a first threshold (approximately 1,000 or 1,024 elements) by iterating over the elements in the list 102 and performing insertion operations for each element using the linear counter 104. The linear counter 104 may use a bit array of a predefined size m to represent a set; all of the bits may be initially set to zero. The cardinality of the set is represented by the number of bits set to one, a number that may be tracked using a counter implemented with an unsigned integer data type, which is initially set to zero. The operation of inserting an element into the set includes computing a hash value for the element, using a suitable hash function and a modulo m operation that yields a value v between zero and m. The position corresponding to v is set to one in the buffer, and the counter is incremented if the bit was initially zero. The operation of performing a union may be implemented as a position-wise bitwise OR operation on two bit arrays corresponding to the two sets on which the operation is to be performed. The counter is updated with the number of bits set in the resulting bit array. Querying the cardinality involves retrieving the counter value w and computing the cardinality as follows:

$$\hat{n} = -m\ln\frac{m-w}{m} \quad (1)$$

Given the fixed size of bit array m, all the operations above may be performed in constant time. An appropriate size of the bit array may be chosen based on the value n, up to which cardinality needs to be estimated, and the permitted error in reported cardinalities using the equations below. Here, $$t = \frac{m}{n}$$

is the load factor, $\epsilon$ is the standard error of the cardinality, and E denotes the expected value. The bounds on accuracy of the cardinality may hold only up to the pre-decided limit n.

$$E\left(\frac{\hat{n}}{n}\right) - 1 = \frac{e^t - t - 1}{2n} \quad (2)$$

$$m > \max\left(5, \frac{1}{(\epsilon t)^2}\right) \times (e^t - t - 1) \quad (3)$$

Once the cardinality of the set increases past a second threshold (in one embodiment, approximately 20,000 elements) the linear counter 104 is converted to a PCSA 106. A set representation using PCSA may use an array of bit arrays; the number of bit arrays is denoted by m, and the number of bits in each bit array by b. Thus, the total size of the memory consumed is m×b. The insertion operation for the PCSA 106 involves computing a hash over the input element to produce a value h. The first k=log$_2$ m bits are used to select a particular bit array indexed from zero to m. The first position with value one from the right-hand side is identified in the rest of the bits, and that position is set to one in the selected bit array. The operation of performing a union is a position-wise bitwise OR operation on two arrays of bit arrays, corresponding to the two sets on which the operation is to be performed. Querying for the cardinality involves identifying the number of one-valued positions (without a zero in between) from the right hand side (for example, a bit array with value 00001111 should produce a value of 4) for each of the m buffers and summing their values, which is denoted by S. After S is computed, the cardinality is estimated as follows.

$$\hat{n} = \frac{m}{\phi_m} 2^{\frac{s}{m}} \quad (4)$$

Note that $\phi_m$ is an estimation factor based on m. Given the fixed size of bit arrays and the fixed number of bit arrays it follows that all operations may be performed in constant time. The size of the bit arrays b determines the maximum cardinality up to which PCSA can provide a reasonable estimate and the number of bit arrays m determines the standard error in the estimation of the cardinality which is bounded by 1.30/$\sqrt{m}$. In an alternative embodiment, a log-log counter is used in place of the PCSA 106; the log-log counter may permit the estimation of cardinalities in the order of billions using the same amount of space. PCSA modifies bits in a bitmap to maintain a record of the first 1-bits in hash values of elements to be inserted, and then calculates the highest position held by a 1-bit in a hash value by looking at the position of the MSB in the bitmap. Therefore, the highest position that may be recorded by PCSA is limited by the size of the underlying bitmap. A log-log counter, on the other hand, stores the highest position held by a 1-bit directly in the bitmap. Therefore, the highest position that can be recorded becomes 2 raised to the size of the bitmap. Because the biggest cardinality that may be measured increases with the highest position that can be recorded, a log-log counter may estimate much larger cardinalities using the same amount of space as a PCSA buffer.

To convert from the linear counter 104 to the PCSA 106, a plurality of random numbers is generated based on the data represented by the linear counter. In one embodiment, the number of random numbers generated is equal to or approximately equal to the cardinality of the set reported by the linear counter. The PCSA, in accordance with its properties, uses the randomness in the bit representation of its input elements to estimate the cardinality of the incoming stream. The nature of the PCSA approach relies on hashing the data to a uniform pseudorandom value, and thus the original data may be simulated by simply generating the same number of uniform pseudorandom values (using, e.g., a standard random-number generator). Hence, inserting numbers uniformly randomly to the PCSA (in accordance with the cardinality of the set reported by the linear counter) produces the same internal structure that it would have had, had all the original numbers been inserted directly to it (from, e.g., the unsorted list, as described in existing systems).

Figure 2:
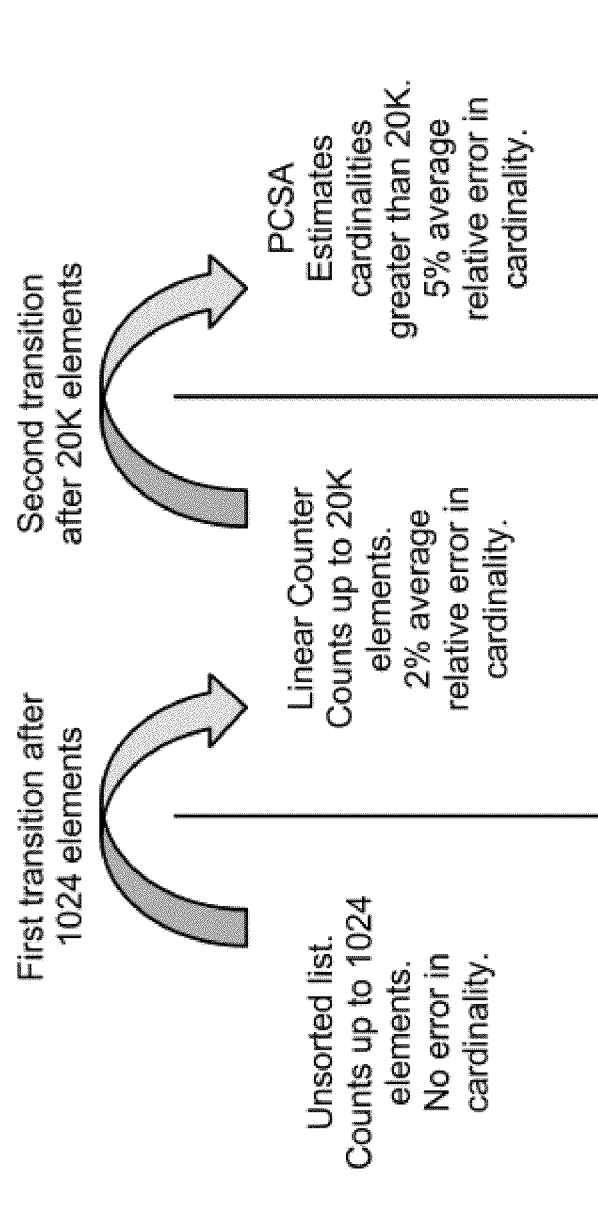
FIG. 2 illustrates properties of the proposed set representation for different set cardinalities.

FIG. 2 illustrates the provable upper bounds on the error in the cardinality for the unsorted list 102, linear counter 104, and PCSA 106. The set operations discussed above (insertion, union, and cardinality) may be performed in constant time for each of the three representations, and the memory footprint of each representation is constant. The average error in cardinality estimation may be less than approximately 5%.

In various embodiments, a union operation may operate on two sets having the same or different representations (e.g., two uncompressed sets, two compressed sets, or one compressed set and one uncompressed set). In the first case, involving two uncompressed sets, the cardinality of the union of the sets may exceed the capacity of 1,000 elements; in this case, the data structure transitions to the compressed state. If the cardinality of the union is under 1,000 elements, the data structure remains in uncompressed state. In the case of two compressed sets, the result of the union is simply the result of the position-wise OR operation over the entire chunk of memory. In the final case of one compressed and one uncompressed set, all of the elements in the uncompressed set are inserted in the compressed set.

In one embodiment, an uncompressed set of data is converted to a compressed representation when a dimension in an OLAP cube is folded into a measure. Because the number of rows in a database that stores an OLAP cube grows with the number of unique values of each dimension in the cube (the worst case being a product of the number of unique values in each dimension), dimensions having a high number of unique values cannot be retained in a cost-effective manner (an example of such a dimension is a customer identifier or subscriber identifier which will have as many unique values as the number of customers or subscribers). One approach of dealing with this problem is converting such a dimension to a set and introducing it as a measure. More generally, the database that stores the OLAP cube is conventional and may be queried in any suitable manner; the operation OLAP databases is well-known in the art, and users may query the various OLAP dimensions to determine, as noted earlier, the number of cellular phone calls made in a specific region during a specified time period, or the number of cellular phone calls made by certain types of devices on a particular telecommunications network.

Figure 3A:
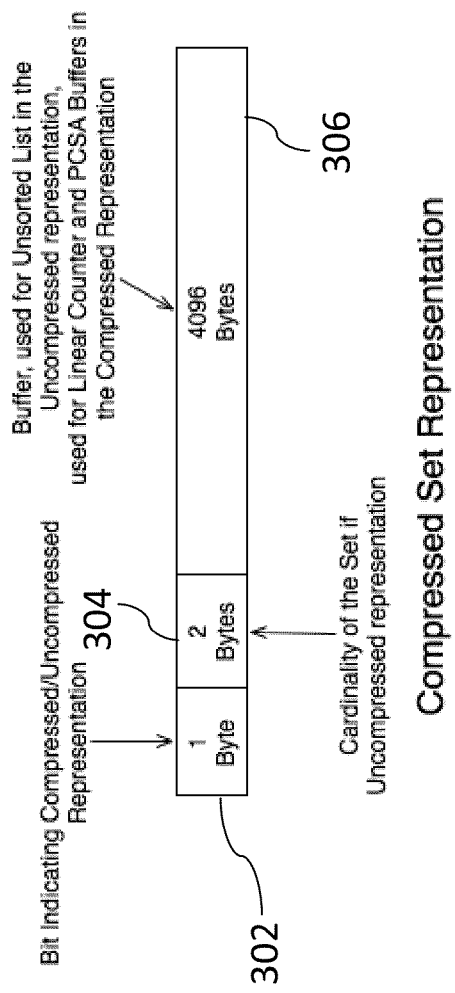
FIGS. 3A-G illustrate an example of the operation of one embodiment of the present invention.

FIGS. 3A-3G illustrate an example of the operation of one embodiment of the present invention. In this example, as shown in FIG. 3A, the storage space for each set has been divided into three fields: a first field 302 that holds a one-bit value indicating whether the set is compressed or uncompressed; a second field 304 that holds a two-bit value indicating the cardinality of the set (if the set is uncompressed); and a third field 306 that holds the unsorted list, linear counter, or PCSA data.

Figure 3B:
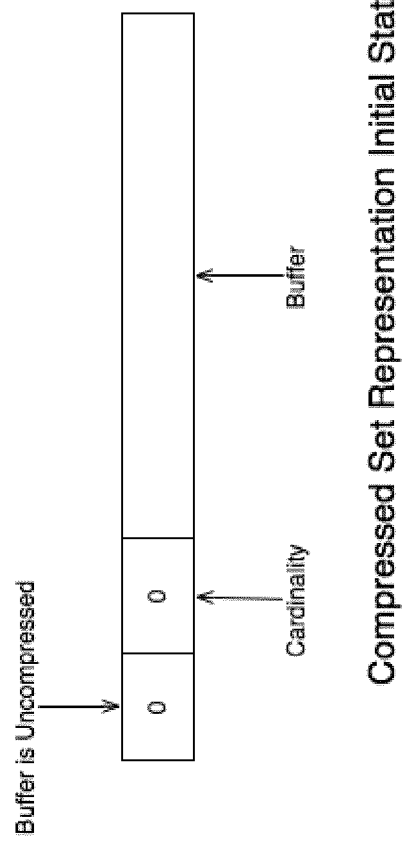
Figure 3C:
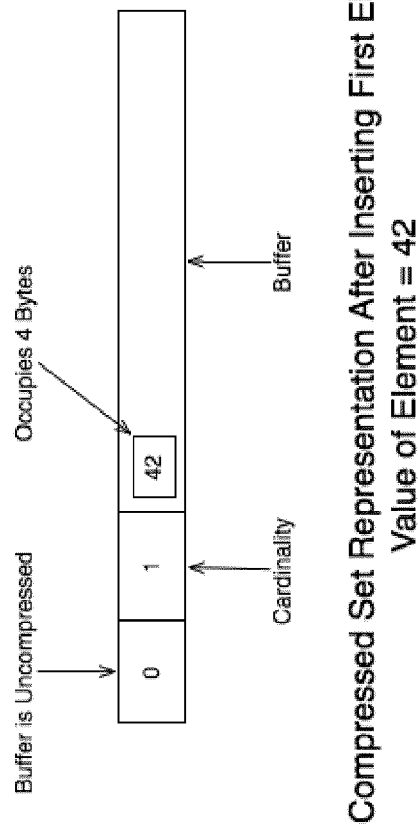
Figure 3D:
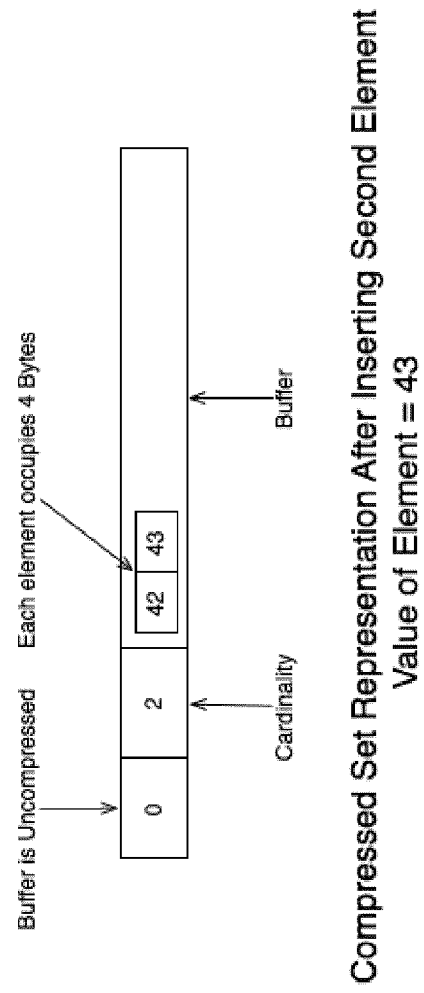
Figure 3E:
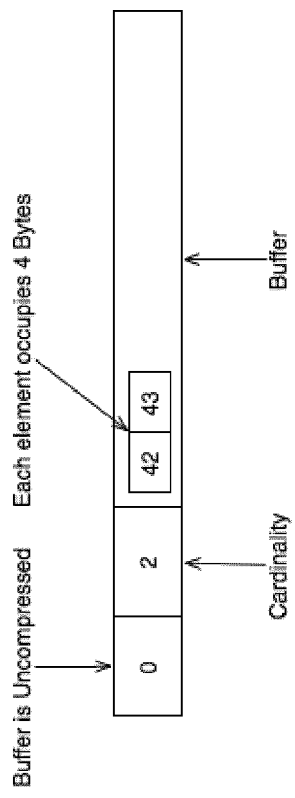

FIG. 3B illustrates the set representation upon initialization; the first field 302 contains a zero, indicating the set is uncompressed, the second field 304 contains a zero, indicating that the cardinality of the set is zero, and the third field 306 is empty. In FIG. 3C, a single element (the number "42") has been added to the third field 306. The number may be represented by a 32-bit integer; if other types of data are to be represented by the set, 32-bit hashes pointing to the other types of data may stored. As FIG. 3C shows, the second field 304 now contains a one indicating that the cardinality of the set is one. A second element (the number "43") is added in FIG. 3D, and the second field 304 is updated to two accordingly. In FIG. 3E, a third element (the number "42") is added to the set; because this value already exists in the set, however, the cardinality is not increased and the second field 304 remains at two. The upper limit of the unsorted list is reached in FIG. 3F; the cardinality of the set (as indicated by the second field 304) is 1,024.

Figure 3F:
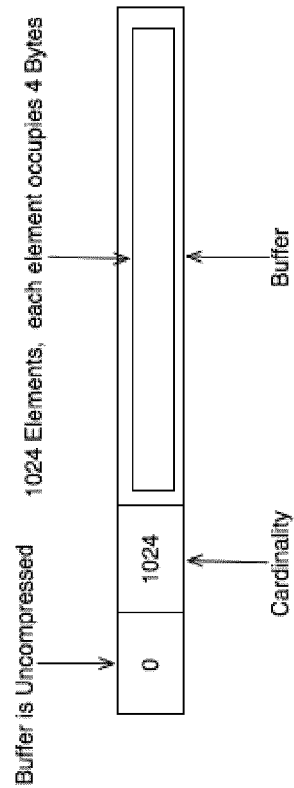
Figure 3G:
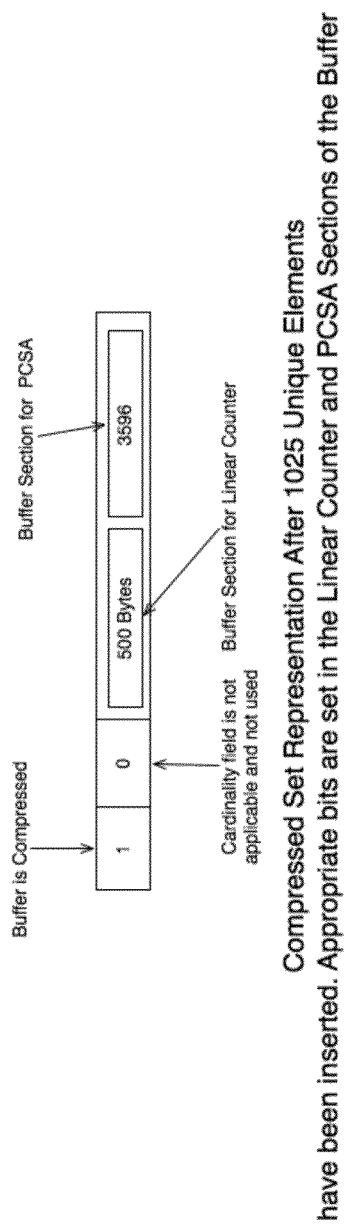

In FIG. 3G, the unsorted list of FIG. 3F is converted into a linear counter. Each element to be inserted is first hashed (using, e.g., a murmur hash-3 algorithm), and the generated hash value is passed to the buffer 306. For example, if the integer 2000 is to be added to the set, the hash value (as computed by murmur hash-3 algorithm) is 00001001 11101011 01110111 11111000 10100111 01001011 11010010 01000110. The linear counter calculates the remainder of this hash value when divided by the size of the buffer 306 (32,768 bits, in this example). The remainder, 27,511, is the position of a bit in the buffer 306 that is set to one.

In FIG. 3H, the linear counter of FIG. 3G is converted to a PCSA. As described above, because the original, unsorted list is no longer available, the contents of that list cannot be used to initialize the PCSA in a manner similar to that of the initialization of the linear counter. Instead, a number of random values are generated and added to the PCSA. In one embodiment, the number of random values is equal to (or approximately equal to) the cardinality of the linear counter. The PCSA representation uses a hash value, but in a way different from that of the linear counter: the hash value is divided by the number of maps in the PCSA buffer (1024, in this example). The first non-zero bit in the quotient gives the position of a bit in one of the PCSA maps. In this example, the quotient is zero. The remainder of the division operation gives the ID of the PCSA map in which is set to one. In this example, the map ID is 887; 0th bit in the 887th PCSA map is thus set to 1.

Figure 4:
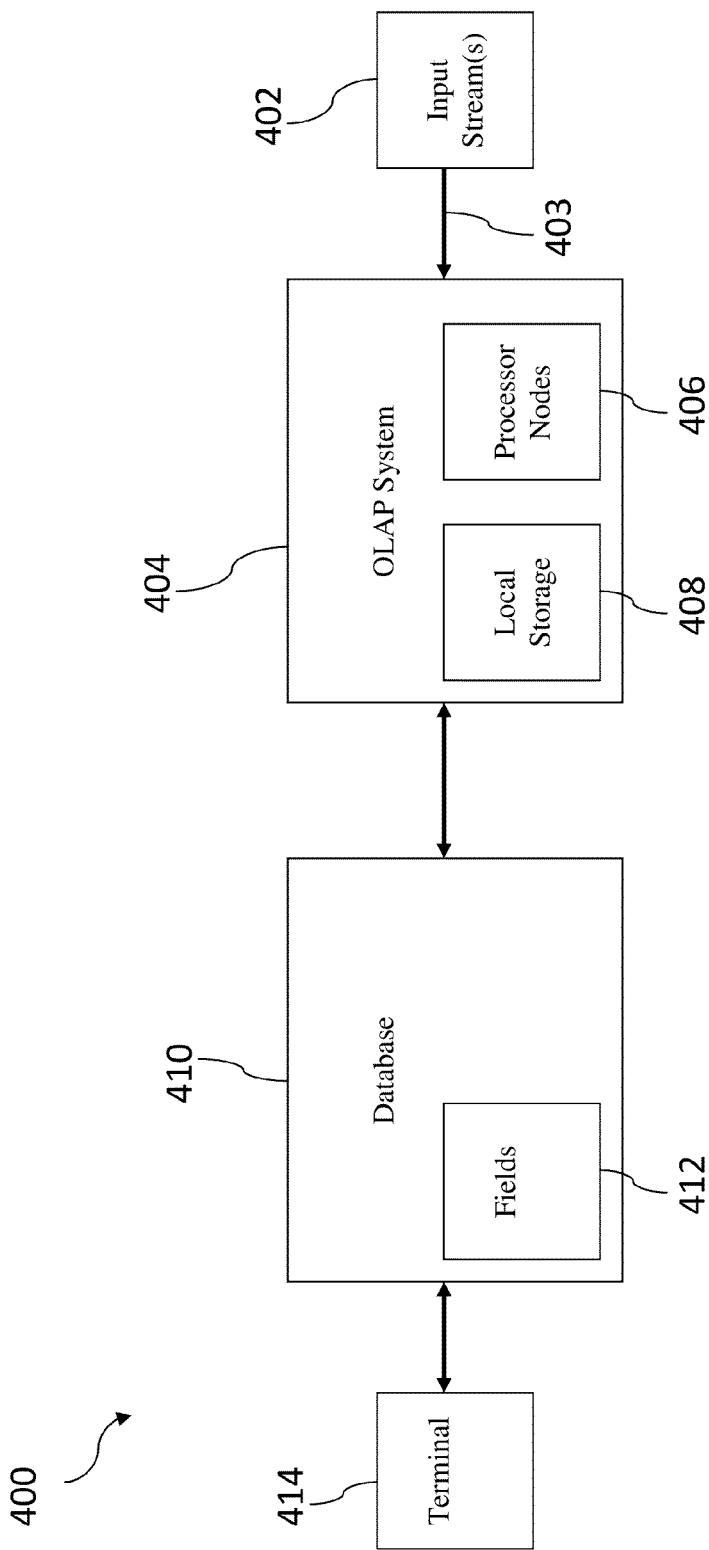
FIG. 4 illustrates a system for maintaining a cardinality of a stream of data in accordance with an embodiment of the present invention.

FIG. 4 illustrates, in block-diagram form, an exemplary system 400 for performing cardinality estimation on a stream of real-time data 402. An OLAP system 404 receives the one or more streams 402 via, for example, a network interface 403. The OLAP system 404 may include one or more processor nodes 406 (e.g., CPUs, GPUs, DSPs, or any other type of processor) and associated support circuitry and systems. Local storage 408 may be used to the input stream 402 and/or processed versions thereof. The local storage may include any type of volatile or non-volatile memory, such as random-access memory, magnetic or solid-state drives, flash memory, or any combination thereof. The OLAP system 404 may incorporate information in the data stream 402 into an OLAP cube, which may be stored in a database 410. One or more fields 412 in the database may store an unsorted list, linear counter, or PCSA in accordance with embodiments of the invention. A terminal 414 (e.g., a workstation) may be used to view, request, or manipulate the OLAP cube (e.g., request information from the OLAP cube that requires a cardinality estimation and/or union operation be performed using one or more of the fields 412).

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, Python, or JAVA. Hashing functions may be implemented using a Murmur hash integration algorithm. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for storing a cardinality of a plurality of unique items of data in a received data stream, the method comprising:
    storing, in a computer memory, unique data items in the form of an unsorted list;
    when the number of unique items stored in the computer memory crosses a first threshold, converting the items in the unsorted list into a linear counter executable by a processor, discarding the unsorted list from the computer memory, and causing the processor to count further unique items in the received data stream using the linear counter; and
    when the number of unique items stored in the computer memory crosses a second threshold, converting the data in the linear counter into a PCSA structure or log-log counter, discarding the linear counter from the computer memory, and causing the processor to count further unique items in the received data stream using the PCSA structure or log-log counter,
    wherein converting the data in the linear counter into the PCSA structure comprises inserting a plurality of random numbers into the PCSA structure.

2. The method of claim 1, wherein the first threshold is 1,024 elements and the second threshold is 20,000 elements.

3. The method of claim 1, wherein the unsorted list, linear counter, and PCSA or log-log counter use the same memory footprint.

4. The method of claim 3, wherein a size of the memory footprint is less than approximately four kilobytes.

5. The method of claim 1, wherein the plurality of random numbers has a size approximately equal to a cardinality of the linear counter.

6. The method of claim 1, further comprising (i) receiving a query for the number of unique items in the data stream and (i) responding to the query using information in the unsorted list, linear counter, or PCSA.

7. The method of claim 1, further comprising performing a union operation on the unsorted list and a second unsorted list.

8. The method of claim 7, further comprising converting a result of the union operation into a linear counter if a size of the result of the union operation exceeds a threshold.

9. The method of claim 1, further comprising performing a union operation on the linear counter and a second linear counter.

10. The method of claim 9, further comprising converting a result of the union operation into a PCSA structure if a size of the result of the union operation exceeds a threshold.

11. The method of claim 1, further comprising performing a union operation on the linear counter and a second unsorted list.

12. The method of claim 11, further comprising converting a result of the union operation into a PCSA structure if a size of the result of the union operation exceeds a threshold.

13. The method of claim 1, further comprising (i) organizing the data items within a database and (ii) querying the database to identify unique data items consistent with a query.

14. A system for determining a number of unique items of data in an incoming data stream, the system comprising:
   a network port for receiving the data stream;
   a memory for storing at least a portion of the data stream; and
   a processor for analyzing the data stream and maintaining a data structure representing the number of unique items therein,
   wherein the processor is configured to convert the data structure from an unsorted list to a linear counter when the number of unique items crosses a first threshold and from the linear counter to a PCSA structure or log-log counter when the number of unique items crosses a second threshold,
   wherein converting the data in the linear counter into the PCSA structure comprises inserting a plurality of random numbers into the PCSA structure.

15. The system of claim 14, wherein the data structure is a set.

16. The system of claim 15, wherein the set is a measure in an OLAP cube.

17. The system of claim 14, wherein the data structure is stored in a field in a database.

18. The system of claim 14, wherein the incoming data stream comprises cellular-phone data.

19. The system of claim 14, further comprising:
   a database management system executable by the processor;
   an input device for receiving a database query;
   wherein the database management system configured to locate data in the memory consistent with the query.

20. A method for storing a cardinality of a plurality of unique items of data in a received data stream, the method comprising:
   storing, in a computer memory, unique data items in the form of an unsorted list;
   when the number of unique items stored in the computer memory crosses a first threshold, converting the items in the unsorted list into a linear counter executable by a processor, discarding the unsorted list from the computer memory, and causing the processor to count further unique items in the received data stream using the linear counter;
   when the number of unique items stored in the computer memory crosses a second threshold, converting the data in the linear counter into a PCSA structure or log-log counter, discarding the linear counter from the computer memory, and causing the processor to count further unique items in the received data stream using the PCSA structure or log-log counter; and
   performing (i) a union operation on the unsorted list and a second unsorted list, (ii) a union operation on the linear counter and a second linear counter, or (iii) a union operation on the linear counter and a second unsorted list.

21. A system for determining a number of unique items of data in an incoming data stream, the system comprising:
   a network port for receiving the data stream;
   a memory for storing at least a portion of the data stream; and
   a processor for analyzing the data stream and maintaining a data structure representing the number of unique items therein,
   wherein the processor is configured to convert the data structure from an unsorted list to a linear counter when the number of unique items crosses a first threshold and from the linear counter to a PCSA structure or log-log counter when the number of unique items crosses a second threshold; and
   wherein the processor is further configured to perform (i) a union operation on the unsorted list and a second unsorted list, (ii) a union operation on the linear counter and a second linear counter, or (iii) a union operation on the linear counter and a second unsorted list.

* * * * *